Aug. 7, 1962  A. BULOVA ET AL  3,047,944
HEAD CONSTRUCTION FOR ELECTRIC RAZORS
Filed March 13, 1957  2 Sheets-Sheet 1
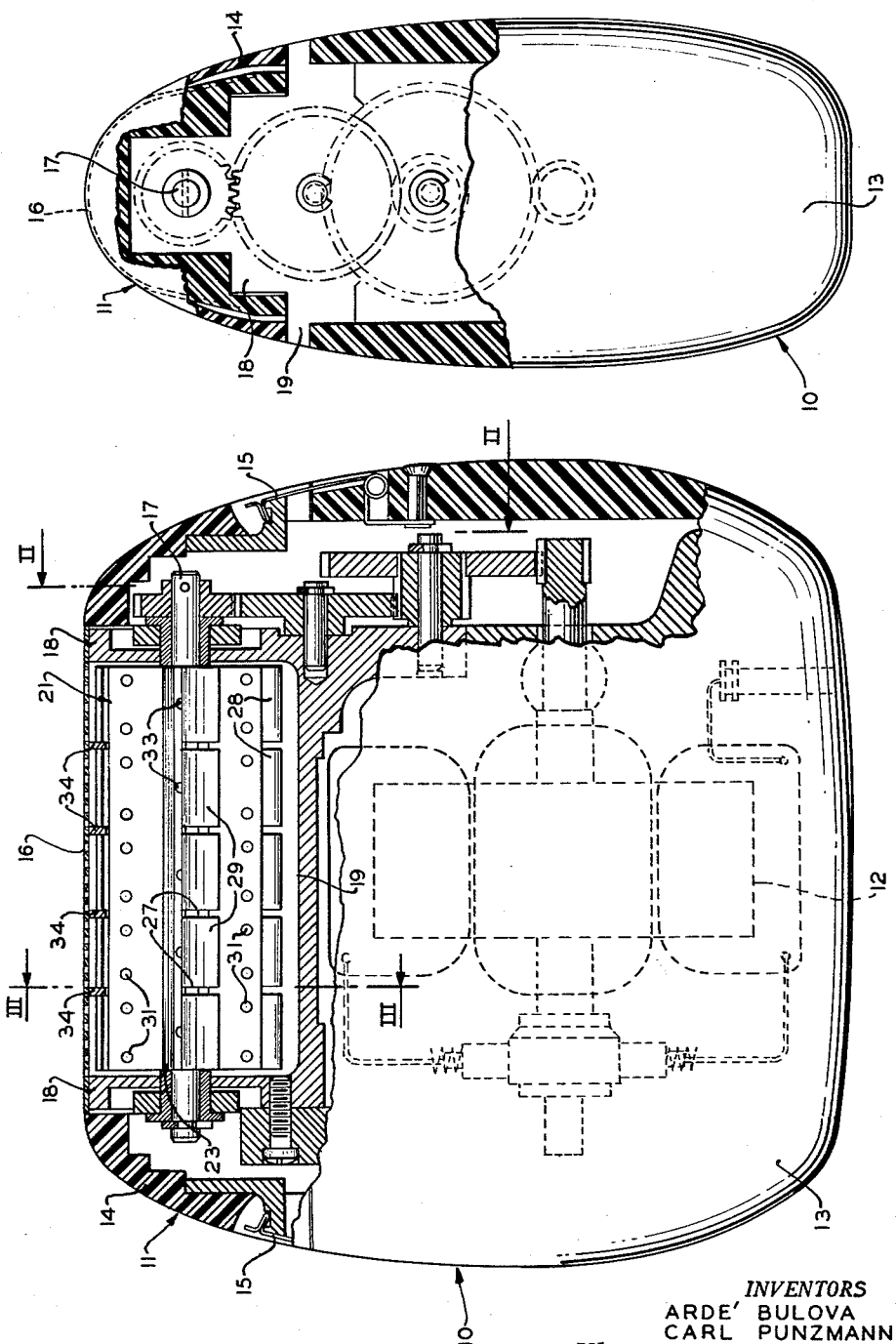
INVENTORS
ARDE' BULOVA
CARL PUNZMANN
BY
ATTORNEY

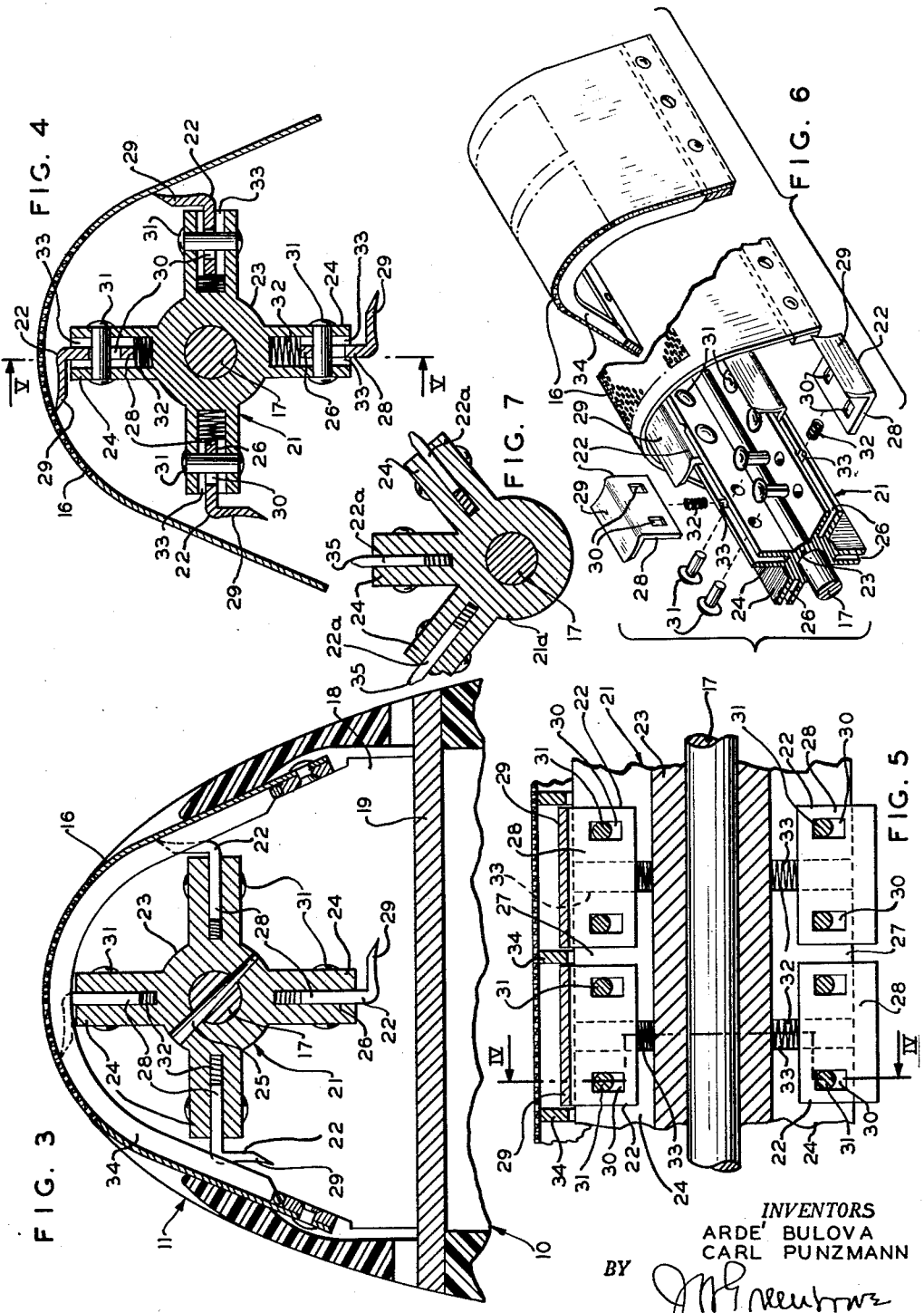

United States Patent Office 3,047,944
Patented Aug. 7, 1962

3,047,944
HEAD CONSTRUCTION FOR ELECTRIC RAZORS
Ardé Bulova, New York, and Carl Punzmann, Rego Park,
N.Y., assignors to Bulova Watch Company, Inc., Flushing, N.Y., a corporation of New York
Filed Mar. 13, 1957, Ser. No. 645,758
10 Claims. (Cl. 30—43)

This invention relates to head construction for electric razors, and applies to the type of razor wherein shearing or cutting is effected by sweep of a blade in contact with the rear surface of a grill the front surface of which is pressed against and slid around on the area where hair growth requires shaving.

Electric razors of the general type indicated have commonly employed a grill, a portion of which is a segment of a cylinder and have used blades coextensive with the length of that cylindrical grill portion. The grills have been made as thin as possible commensurate with necessary strength to maintain the grill in shape. However, in order to shear as close as possible to the base of the hair, the grill is made so thin that it will deflect or dent inwardly toward the blade from pressure exerted by the user while shaving. Even though the grill possesses adequate resiliency to return it to shape when the pressure is removed, yet it is while the deflection is present that shaving is expected to take place by the blade or blades passing over the deflection. In the prior art, with blades each coextensive with the length of the cylindrical portion of the grill, a deflection of the grill makes a hill over which the blade edge has to ride and since the blades are each longitudinally rigid, most of the blade edge is pushed away from the grill as the one spot rides over the hill and shaving takes place only at that one spot until pressure is released and the grill returns to its cylindrical shape thereat. Also where the hill raises the blade very slightly from the grill, hair will be caught and pulled rather than being cut, much to the discomfort of the user of the razor.

Fundamentally, the invention is directed to overcoming the above-explained inadequacies of previously marketed electric razors.

Likewise of general purport, the invention provides means for overcoming ill effects of grill distortion.

More precisely, the invention provides for blade engagement coextensive with the effective grill length even though regularity of the grill is disturbed by a hill at some local spot thereof.

Specifically stated, an object of the invention is to provide a plurality of blades having end-to-end alignment but individually movable.

A further object of the invention is to provide for distinct grill areas for blades individual thereto, and having a plurality and such areas and blades cumulative lengthwise or the head construction.

Another object of the invention is to provide a plurality of individual blades each of which may follow the contour of its grill area independent of displacement of any other blade in following the contour of its grill area.

Yet another object of the invention is to provide a construction agreeable to use of blades having spring-loading individual to each blade and with the blades arranged in end-to-end alignment.

While certain outstanding objects of the invention are mentioned above, other objects, advantages and beneficial constructional features will appear to persons skilled in the art to which the invention appertains as the description proceeds, both by direct recitation thereof and by implication from the context.

Referring to the accompanying drawings, in which like numerals of reference indicate similar parts throughout the several views:

FIGURE 1 is a view of an electric razor incorporating the novel construction of head of the present invention, showing the razor and its head partially in elevation and partially in section on a plane through the middle thereof and looking at the same toward what will be herein arbitrarily termed the front of said razor;

FIGURE 2 is a vertical section of said razor and its head, taken on a plane indicated by line II—II of FIG. 1;

FIGURE 3 is a cross-sectional view of the shaving head of the razor, as on line III—III of FIG. 1, with the scale of showing somewhat increased;

FIGURE 4 is a sectional view somewhat similar to FIG. 3, but taken partially on offset planes as indicated by section-line IV—IV of FIG. 5;

FIGURE 5 is a longitudinal sectional view of a portion of the shaving head, as on line V—V of FIG. 4;

FIGURE 6 is a perspective view, partially broken away, of the shaving head, and showing some parts in exploded relationship preparatory to assembly; and FIGURE 7 is a showing of appropriate modification for incorporation of the invention in an oscillating type razor.

For orienting the present invention, it is initially pointed out that electric razors in general are made with a body portion for housing a motor, and at the upper end of the body portion provide a head construction which has a grill at the top thereof and a blade or blades within the grill movable with respect thereto for shearing whiskers or the like entering through the grill as said upper end of the head construction is pressed and moved upon the hairy surface. In further explanation, both in the foregoing reference to prior art razors, and reference to the razor embodying the present invention which continues hereinbelow, the directional designations of top, bottom, sides, front and back and so forth is to be understood as arbitrary and used only as applying to the razor or its parts in the position selected for illustration in the drawing, and not to be considered restrictive as to construction or positioning of the shaver or its constituent parts.

Resorting to the use of such arbitrary terminology, the electric razor as illustrated comprises a bottom section 10 and a top section 11 constituting what are generally termed the body portion and the head construction respectively. Said body portion includes an electric motor 12 and a suitable enclosure or casing 13 therefor. The head construction includes a cap 14 which fits on the top of said casing as a continuation thereof and is releasably held thereon by a resilient latch 15. The greater part of the top or forward end of said cap is open and a grill 16 protrudes therefrom, the protruding upper portion of said grill being a segment of a cylinder and perforate to admit whiskers to enter therein, the lower margins of the grill being secured in said cap.

The head construction also includes means within said cap and grill for mounting blades and for effecting a sweep of those blades in a direction circumferentially of the inside surface of the cylindrical segment of the grill, the mounting means, the blades and associated grill areas constituting essential features of the present invention. Since FIGURE 7 illustrates a modified construction wherein the blades are mounted to have an oscillating sweep, the description will be directed initially to FIGURES 1 to 6 wherein the blades are mounted to revolve and have a repetitive sweep always in the same direction. In both constructions, a shaft 17 is provided coaxial with the cylindrical segment of the grill 16, the shaft being suitably journaled in upstanding brackets 18 from a base plate 19 which constitutes the bottom of the cap and extends, removably, across the top of body casing 13. A suitable train of gearing or the like drives said shaft from the motor, oscillating said shaft in the construction of FIG. 7, and rotating said shaft continuously in one direction in FIGS. 1 to 6. Both types of drive are known in the art, so further description thereof is not deemed necessary.

In the specific embodiment of the invention illustrated in FIGS. 1 to 6, a mounting means, designated generally by numeral 21, is provided for retaining and operating a plurality of blades 22. Said mounting means has considerable resemblance to a paddle wheel in that it has a longitudinal hub 23 coaxial with and mounted on said shaft, and has radially projecting splines 24 coextensive with the length of said hub, said hub and splines being coextensive with the perforate portion of the grill and the longitudinal outer edges of the splines being parallel to the axis and proximate to the grill when revolved within the cylindrical segment thereof. The mounting means is secured to the shaft 17 as by a pin 25 so that, like the shaft, it will be driven from motor 12.

In the present showing, there are four of the aforementioned splines, disposed evenly around the hub, but more or less may be employed. As they are all alike, description of one will suffice for all. Along the entire longitudinal outer edge of each spline 24 is a slot 26 the depth of which is here shown as substantially the radial depth of the spline. Said slot 26 constitutes a means for receiving and holding a plurality of blades 22 arranged endwise with respect to each other and with successive blades spaced from each other to provide a gap 27 therebetween. In FIGURES 1 to 6, each blade is shown as providing a flat shank portion 28 that is properly dimensioned to be slidably mounted in said slot 26 and to protrude therefrom radially outwardly of the spline. At the protruding edge of the blade shank 28 is a transverse lip 29 the far edge of which from the shank is preferably made razor-sharp and constitutes the cutting and shearing edge of the blade. By preference, said lip is slightly concave between the shank and cutting edge so as to enable the cutting edge to be more readily ground and to assure that only the cutting edge shall engage the grill during operation. Said lip is made from resilient and somewhat flexible sheet material.

Each blade 22 is retained in its slot 26 in an appropriate manner preventing it from displacement longitudinally of the slot but permitting it to have limited movement inwardly and outwardly of the slot or radially of the mounting means 21. For this stated purpose, the shank of each blade is shown provided with two parallel elongated apertures 30 extending in a direction toward lip 29 and located near the end edge of said shank. Rivets 31, or other suitable means, are introduced laterally through the spline 24 transversely across slot 26 thereof and through said apertures 30 of the blades. By virtue of said apertures, the blade may slide within the limits of the apertures in the elongated direction of said apertures, thereby enabling the blades to have a limited movement in a direction radially of the mounting means, but as the diameters of the rivets are substantially equal to the width of the apertures, the blade is restrained from movement in a direction longitudinally of slot 26. The use of two elongated apertures 30 and two rivets 31 for each blade deters the blade from undesirable tilting lengthwise. Furthermore by use of apertures the inner ends of which are closed, the blades are prevented from leaving the slot when not otherwise held. The rivets do not have any squeezing or binding effect upon the blades and accordingly function only as guiding means therefor.

Spring loading is provided for the blades so applied that said blades, when not otherwise held, will protrude from their respective slots 26 and splines 24 as far as permitted by the above-described cooperation of elongated apertures 30 and rivets 31. While spring loading may be variously supplied, the particular showing thereof selected for this disclosure comprises a small coil spring 32 located medially under the innermost edge of the blade shank 28, drill holes 33 or other suitable enlargements to receive the same being made in the splines 24 and slots 26, one for each blade.

It is now appropriate to point out that each spline mounts a series of blades 22 each of which is only a small part of the full length of the spline and that the blades of each such series has end-wise relation to the next blade of the series and with a gap 27 between the blades of the series. Since there are a plurality of splines, there will be in a rotational direction a series of said series of blades so that during rotation of the mounting means, each longitudinal series of blades is followed by another longitudinal series of blades thus obtaining a succession of longitudinal series of blades sweeping across the cylindrical segment of the grill. Each such blade will respond individually to the condition or location of the grill area with which it engages, and consequently a hill or other irregularity affecting one blade of a longitudinal series will not displace any other blade of that series, and thus cutting will be effective throughout the length of the grill.

It may also be pointed out that the gaps 27 between blades are arranged so that corresponding gaps of successive series of blades around the mounting means are at the same distances from the end of the rotor. This construction permits the grill 16 to have arched ribs 34 between which the blades will protrude into surface contact with the grill as the rotor or mounting means rotates. Thus the grill is divided longitudinally into arched surface areas supported at each side by the ribs and which therefore tends to confine deformation of the grill to the one arched area without disturbing the cylindrical characteristic of an adjacent area. Such deformations are usually only temporary, being caused by extra pressure applied by the user, and since the grill is resilient it returns to normal shape when the pressure ceases.

Inasmuch as the above-described structure shown in FIGURES 1 to 6 provides for a rotating mounting means or rotor 21, it is feasible to utilize blades 22 with transversely directed lips 29 and cutting edges at the forward ends of said lips. The lips have a forward movement along the surface areas of the grill and the razor edges thus will cut whiskers or the like that protrude through the grill into the cutting path of said edges. This is conducive to obtaining a close shave since the whiskers do not have to lean over to engage a side of the perforation where shearing action alone is relied upon by sweep of a blade past the perforation edge. It will of course be understood that all of the lips of all of the blades project in the same forward direction of rotation of the mounting means.

Dealing briefly with the showing of FIG. 7, it has already been stated that the structure there disclosed is a modification adapting the invention to oscillation of the mounting means instead of continuous rotation thereof in a single direction. A plurality of closely grouped splines 24 are shown confined to the upper portion of the mounting means 21a so as to oscillate within the range of the cylindrical portion of the grill, which, if shown, would be a duplicate of grill heretofore described. Each spline 24 of this showing is likewise a duplicate of the splines above described. The blades 22a shown in this instance while having apertured shank, guiding rivets and spring loading as in the preferred embodiment, have to function in both directions of oscillation, and therefore do not have a lateral lip, but project directly outward and have an outward longitudinal shearing edge 35. The modification, like the preferred showing, also provides a series of series of blades.

We claim:

1. Head construction for electric razors comprising a grill having a portion thereof constituted as a segment of a cylinder providing longitudinally of the axis of said segment a plurality of arched perforate cylindrical segment shaving areas, and longitudinally of said axis providing a series of individual blades each individually engageable with a respective one of said perforate cylindrical segment shaving areas, and each individually mounted to be individually slidable in a direction radial to said axis.

2. Head construction for electric razors comprising a grill having a portion thereof constituted as a segment of a cylinder providing longitudinally of the axis of said segment a plurality of arched perforate cylindrical segment shaving areas, and longitudinally of said axis providing a series of series of individual blades in a rotational direction to said axis, said blades of each series in a rotational direction individually engaging in operation against a respective one of said perforate cylindrical segment shaving areas, and all of said blades both in the longitudinal series and in the series in rotational direction, being individually slidable in a radial direction to the axis.

3. Head construction for electric razors comprising a grill having a portion thereof constituted as a segment of a cylinder providing longitudinally of the axis of said segment a plurality of arched perforate cylindrical segment shaving areas, a blade mounting means coaxial to said cylindrical portion of said grill, a longitudinal series of individual blades in endwise relation to each other carried by said mounting means, each of said blades in operation individually engaging with a respective one of said cylindrical segment shaving areas, each blade in said longitudinal series being individually slidable in said mounting means, and said mounting means having rotatable support and rotatable to an extent sufficient to sweep said cylindrical portion of the grill by said series of blades, and each blade of the series being individually slidably responsive to any variations of contour of the arched shaving area swept thereby.

4. Head construction for electric razors comprising a grill having a portion thereof constituted as a segment of a cylinder providing longitudinally of the axis of said segment a plurality of arched perforate cylindrical segment shaving areas, a longitudinal series of individual blades in endwise relation to each other having a sweep across said cylindrical portion of the grill, each blade individually mounted to be individually slidable in a direction radial to the axis of said grill portion and in operation each individually engaging with one of said cylindrical segment shaving areas, and each blade having spring loading to move it toward its respective grill area to thereby cause each blade to individually follow the contour of its respective perforate cylindrical segment shaving area of the grill irrespective of contour being followed by other blades of the longitudinal series.

5. Head construction for electric razors, comprising mounting means having an elongated hub about an axis with a longitudinal spline on said hub, said spline having a longitudinal slot at its edge away from said hub and axis, and a plurality of individual blades in said slot each individually movable in said slot in a direction radial to said axis and toward and away from said hub, and the in and out movement of said blades being individual to each whereby different blades may simultaneously have different projecting relations to said hub.

6. Head construction for electric razors, comprising mounting means having movement in a rotational direction upon a longitudinal axis and having a spline longitudinally of and projecting laterally from said axis, said spline having a longitudinal slot at its outer edge away from said axis, a plurality of individual blades in said slot each movable individually in said slot toward and away from said axis with the in and out movement of said blades individual to each whereby different blades may simultaneously have different projecting relations to said spline, and spring loading for each of said individual blades in said slot tending to move said blades individually from the slot away from said axis.

7. Head construction for electric razors, comprising mounting means having movement in a rotational direction upon a longitudinal axis and having a spline longitudinally of and projecting laterally from said axis, said spline having a longitudinal slot at its outer edge away from said axis, a plurality of individual blades in said slot each movable individually in said slot toward and away from said axis with the in and out movement of said blades individual to each whereby different blades may simultaneously have different projecting relations to said spline, and a plurality of springs, one for each blade, at the edge of said blade nearest the axis and exerting resilient pressure individually on the respective blades engaged thereby tending to move said blades individually outwardly from said slot away from said axis.

8. Head construction for electric razors, comprising mounting means having movement in a rotational direction upon a longitudinal axis and having a spline longitudinally of and projecting laterally from said axis, a plurality of individual blades carried by said spline in endwise relation to each other and each having an individual in-and-out movement in its relation to said axis, means individual to each blade for both guiding the respective blade individually and limiting individual in-and-out movement of each, and spring loading individual to each of said blades exerting outward force on its respective blade.

9. Head construction for electric razors, comprising mounting means having movement in a rotational direction upon a longitudinal axis and having longitudinal splines thereon located with even spacing around said means, a longitudinal series of individual blades in each of said splines with the blades of each longitudinal series conforming in length and longitudinal location to corresponding blades of the other longitudinal series of blades thereby providing a series of series of individual blades, each of said blades having spring loading and individually movable outwardly under influence of the respective spring loading thereof, a grill, and said mounting means rotatable adjacent to said grill and adapted to thereby successively sweep said blades onto said grill at one side and across the grill and off the other side and thereby repetitively sweep said grill in the same direction by a series of series of individual blades individually spring loaded against said grill.

10. Head construction for electric razors comprising a grill having a portion thereof constituted as a segment of a cylinder providing longitudinally of the axis of said segment a plurality of arched perforate cylindrical segment shaving areas, an oscillating mounting means having a hub coaxial to said cylindrical portion of said grill, said oscillating means having a group of splines directed toward said grill and adapted to oscillate back and forth adjacent thereto, a longitudinal series of individual blades in endwise relation to each other carried by each of said splines, corresponding ones of said blades in each of said series of blades individually engaging with a respective one of said arched perforate cylindrical segment shaving areas, each blade in each of said longitudinal series being individually slidable in its respective spline, and each blade of each series being individually slidable responsive to any variations of contour of the arched shaving area against which it engages at any position of oscillation of said mounting means.

References Cited in the file of this patent

UNITED STATES PATENTS

| | | |
|---|---|---|
| 2,219,090 | Henderson | Oct. 22, 1940 |
| 2,220,800 | Jepson | Nov. 5, 1940 |
| 2,234,891 | Bruecker | Mar. 11, 1941 |
| 2,265,281 | Hale | Dec. 9, 1941 |
| 2,286,443 | Scully | June 16, 1942 |
| 2,289,323 | Dettle | July 7, 1942 |

(Other references on following page)

UNITED STATES PATENTS

| | | |
|---|---|---|
| 2,292,931 | Dicke | Aug. 11, 1942 |
| 2,296,093 | Dalkowitz | Sept. 15, 1942 |
| 2,298,872 | Dalkowitz | Oct. 13, 1942 |
| 2,315,274 | Rand | Mar. 30, 1943 |
| 2,321,932 | Nyhagen | June 15, 1943 |
| 2,331,500 | Rand | Oct. 12, 1943 |
| 2,332,405 | Smith | Oct. 19, 1943 |
| 2,508,570 | Groves | May 23, 1950 |
| 2,536,015 | Konrad | Dec. 26, 1950 |
| 2,584,590 | Julian | Feb. 5, 1952 |
| 2,618,055 | Robertson | Nov. 18, 1952 |
| 2,794,247 | Negromanti | June 4, 1957 |
| 2,795,042 | Ritchey et al. | June 11, 1957 |

FOREIGN PATENTS

| | | |
|---|---|---|
| 1,050,751 | France | Sept. 9, 1953 |